(12) United States Patent
Huang

(10) Patent No.: US 7,262,960 B2
(45) Date of Patent: Aug. 28, 2007

(54) RETAINING MODULAR MECHANISM FOR A HARD DISK AND A MODULAR FRAME THEREOF

(75) Inventor: Ya-Chi Huang, Taipei (TW)

(73) Assignee: Lite-On Technology Corporation, Taipei (TW)

( * ) Notice: Subject to any disclaimer, the term of this patent is extended or adjusted under 35 U.S.C. 154(b) by 0 days.

(21) Appl. No.: 11/411,886

(22) Filed: Apr. 27, 2006

(65) Prior Publication Data
US 2007/0103861 A1    May 10, 2007

(30) Foreign Application Priority Data
Nov. 8, 2005    (TW) ............... 94219343 U

(51) Int. Cl.
*G06F 1/16* (2006.01)
(52) U.S. Cl. ............ 361/685; 361/727; 361/726
(58) Field of Classification Search ........... 361/685, 361/679, 724–727; 312/223.1, 223.2
See application file for complete search history.

(56) References Cited

U.S. PATENT DOCUMENTS

| | | | |
|---|---|---|---|
| 5,510,955 A * | 4/1996 | Taesang | 361/685 |
| 5,564,804 A * | 10/1996 | Gonzalez et al. | 312/223.2 |
| 6,452,792 B1 * | 9/2002 | Chen | 361/685 |
| 6,556,528 B1 * | 4/2003 | Kuang | 720/657 |
| 6,826,045 B2 * | 11/2004 | Chen | 361/685 |
| 2004/0184231 A1 * | 9/2004 | Chen | 361/685 |
| 2005/0088788 A1 * | 4/2005 | Nishiyama et al. | 360/324.2 |

* cited by examiner

Primary Examiner—Jayprakash Gandhi
Assistant Examiner—Ingrid Wright
(74) Attorney, Agent, or Firm—Rabin & Berdo, P.C.

(57) ABSTRACT

A retaining modular mechanism for a hard disk and a modular frame thereof simplifies the conventional process of locking and unlocking a hard disk and reduces assembly time. Fixing holes are applied on two sides of a hard disk that includes a receiving housing and a modular frame. The receiving housing has a bottom board and a side board. The modular frame has a base positioned on the bottom board, a locking part and an elastic element positioned between the base and a locking part. The locking part has a bottom wall slidably mounted on the base, and a sidewall positioned on the side board of the receiving housing. The base has a fixing sidewall opposite the sidewall of the locking part. The fixing sidewall and the sidewall of the locking part are respectively formed with a plurality of fixing pins. The fixing pins insert into the fixing holes.

23 Claims, 7 Drawing Sheets

RETAINING MODULAR MECHANISM FOR A HARD DISK AND A MODULAR FRAME THEREOF

BACKGROUND OF THE INVENTION

1. Field of the Invention

The present invention relates to a retaining modular mechanism for a hard disk and a modular frame thereof, which is applied for fixing a hard disk in a host housing of a computer, and particularly to a retaining modular mechanism for a hard disk and a modular frame thereof that doesn't require any tools or screws to fix the hard disk into the housing.

2. Description of the Prior Art

To ensure a precise, high-speed operating disc drive is disposed stably onto a host housing of a computer, the prior art usually locks the disc drive onto a disc drive frame in the host housing using screws. However, the space around the host housing located at the two sides of the disc drive is small and disassembling the disc drive from the host housing is inconvenient.

In the prior art, a step of locking screws in the fixing process needs to be made and this requires a screwdriver. The assembling and disassembling process is time-consuming and troublesome and the screws are easily lost. For a manufacturer or service center this is bothersome as they are more and more concerned about efficiency. Furthermore, if the screws are dropped on the motherboard and are not removed, the motherboard will short when the computer is turned on. Therefore, the computer will be damaged.

With the above-described problems of the prior art in view, an object of the present invention is to provide a retaining modular mechanism for a hard disk and modular frame thereof that overcomes the disadvantages of the prior art.

SUMMARY OF THE INVENTION

An object of the present invention is to provide a retaining modular mechanism for a hard disk that simplifies and shortens the process and time required for locking or unlocking the hard disk. Furthermore, because the present invention means screws are not needed, the user does not need to be worried that screws may have fallen on the motherboard.

Another object of the present invention is to provide a modular frame applied in a retaining modular mechanism for a hard disk that has a modular design structure and can be considered as a single component to be manufactured in advance, and can be applied in other models.

In order to achieve the main object, the present invention provides a retaining modular mechanism for a hard disk, for fixing a hard disk, the hard disk is formed with a plurality of fixing holes on two sides thereof, comprising a receiving housing, and a modular frame. The receiving housing has a bottom board and a side board bent from a side of the bottom board. The modular frame has a base located on the bottom board, a locking piece and an elastic element positioned between the base and the locking piece. The locking piece has a bottom wall slidably mounted on the base, and a lateral wall extending upwardly from a side of the bottom wall and located on the side board of the receiving housing. The base has a retaining sidewall opposite to the lateral wall of the locking piece, a plurality of locking pins respectively formed on the retaining sidewall and the lateral wall of the locking piece. The locking pins are inserted in the fixing holes of the hard disk.

In order to achieve the second object, the present invention provides a modular frame, which is used in a retaining a modular mechanism for a hard disk, and comprises a base, a locking piece and an elastic element. The base is made of metallic board and has a retaining sidewall formed with a plurality of locking pins. The locking piece has a bottom wall slidably mounted on the base and a lateral wall protruding upwardly from a side of the bottom wall and is disposed opposite to the retaining sidewall of the base. The lateral wall is formed with a plurality of locking pins. The elastic element is located between the base and the bottom wall of the locking piece.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
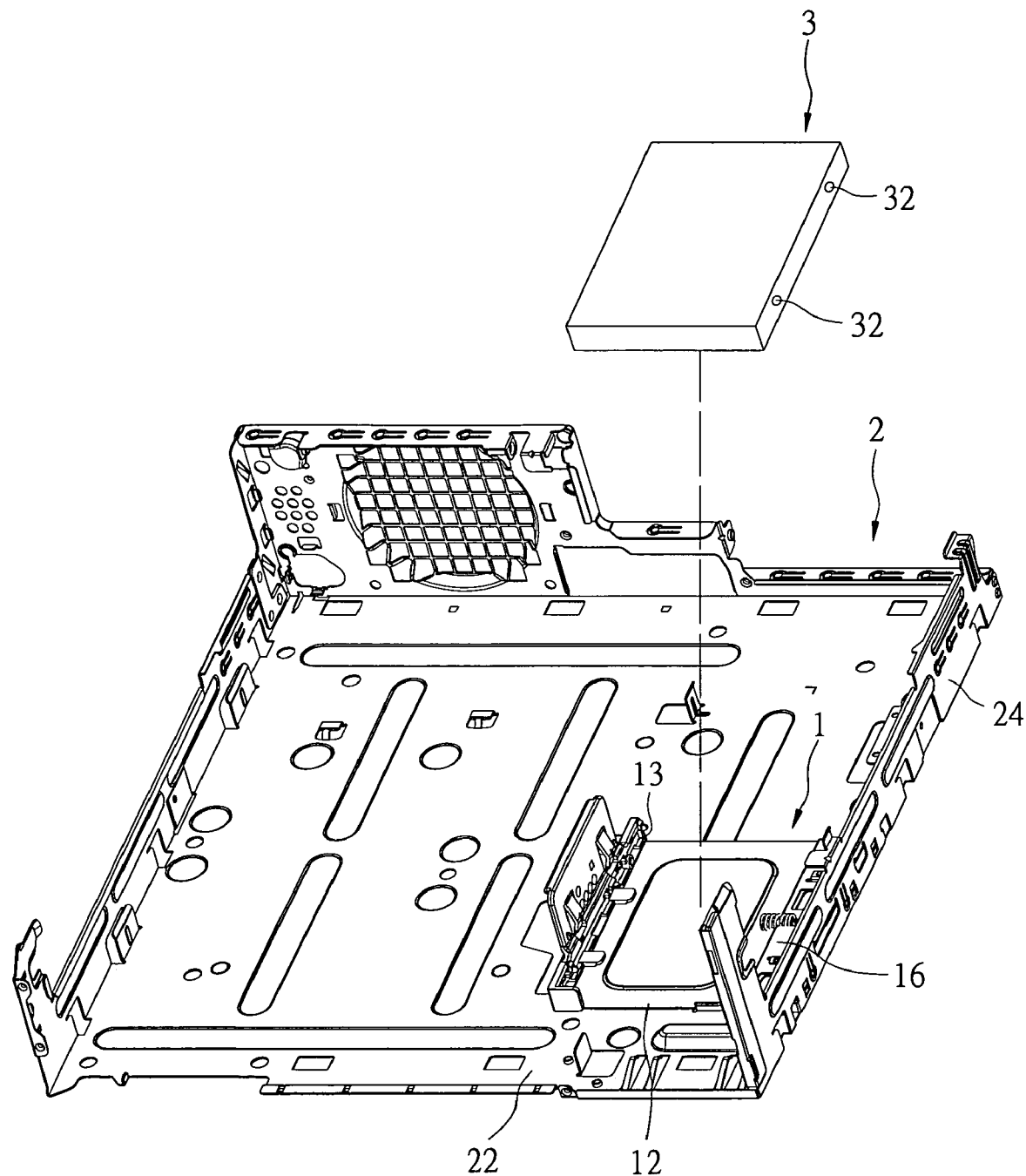
FIG. 1 is an assembled perspective view of a retaining modular mechanism for a hard disk according to the present invention.
Figure 2:
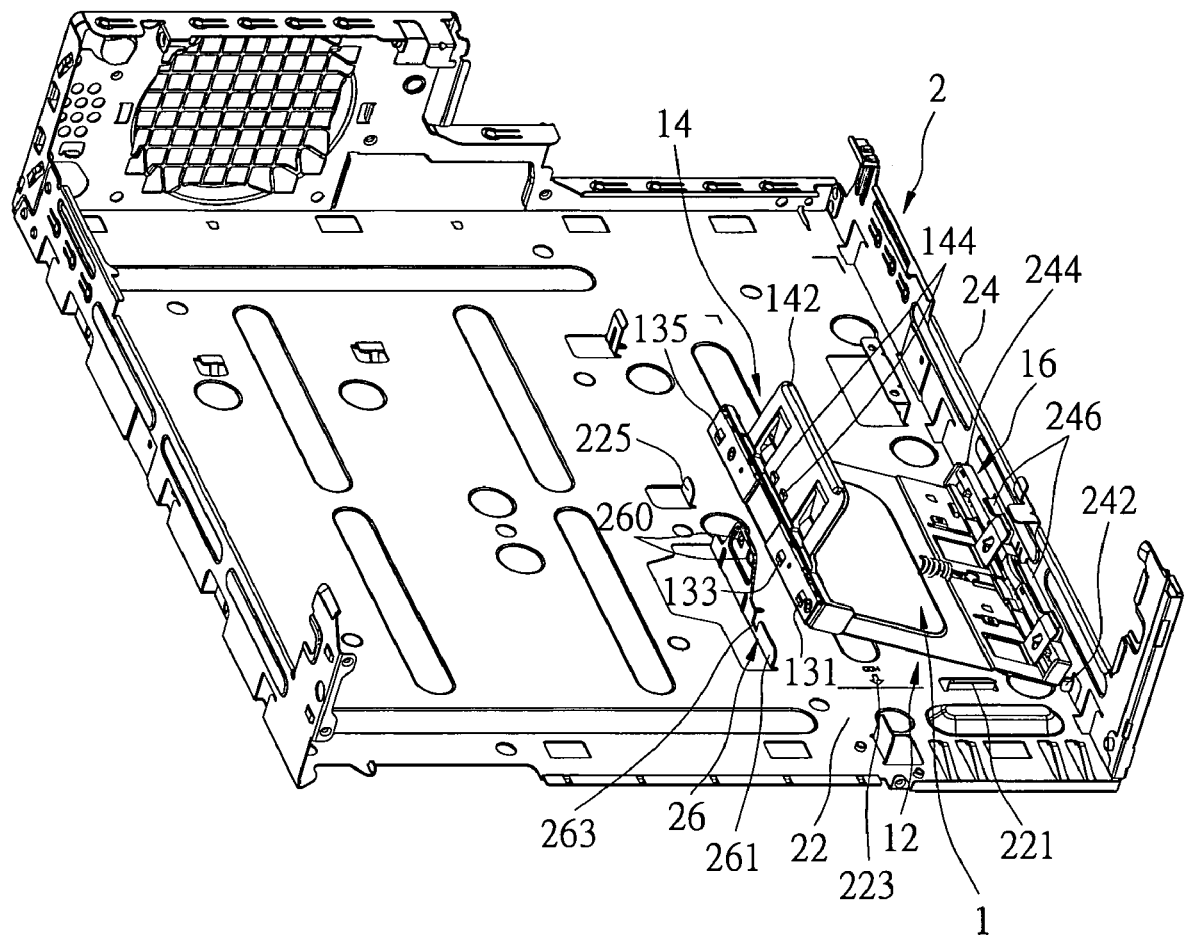
FIG. 2 is a perspective view of a retaining modular mechanism for a hard disk according to the present invention.

Reference is made to FIGS. 1 and 2, which are an assembled perspective view and a perspective view of a retaining modular mechanism for a hard disk according to the present invention. The present invention provides a retaining modular mechanism for fixing a hard disk 3. The hard disk 3 has a plurality of fixing holes 32 formed at two sides respectively (the fixing holes 32 are preferably the original screw holes for clipping and fixing). The retaining modular mechanism for a hard disk comprises a modular frame 1 and a receiving housing 2. The modular frame 1 is used for clipping the hard disk 3 and is assembled to the receiving housing 2 thereby allowing the hard disk 3 to be dismounted quickly and easily. The receiving housing 2 in this embodiment is a base housing of a computer host, and has a bottom board 22, and a side board 24 bent upwardly from one side of the bottom board 22.

Reference is made to FIG. 2, which is a perspective view of a retaining modular mechanism for a hard disk of the present invention. To fix the modular frame 1 on the receiving housing 2 in this embodiment, the bottom board 22 of the receiving housing 2 has a plurality of locating tabs 221, 225 protruding from it. The side board 24 of the receiving housing 2 has a plurality of locating tabs 242, 244 and 246 protruding from it, so that one side and the bottom of the modular frame 1 can be located in the receiving housing 2. Moreover, the bottom board 22 of the receiving housing 2 has a clipping plate 26 protruding from it that is opposite to the side board 24, so that one side of the modular frame 1 can be clipped with the clipping plate 26.

In this embodiment, the bottom board 22 further comprises a kindly indicating symbol 223 for indicating an assembling direction of the hard disk 3 (as shown in FIG. 2).

Figure 3:
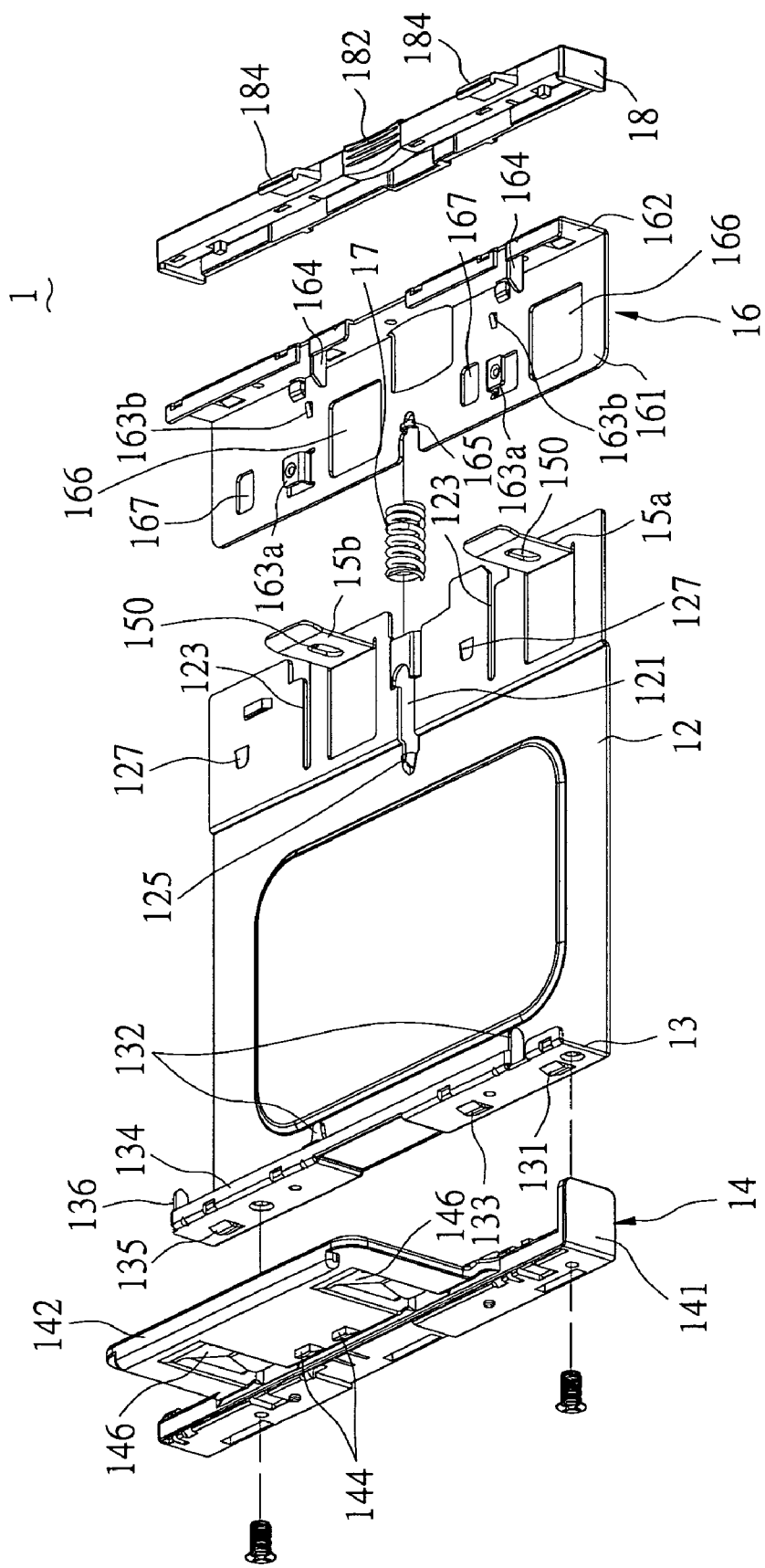
FIG. 3 is an exploded perspective view of a modular frame according to the present invention.
Figure 4:
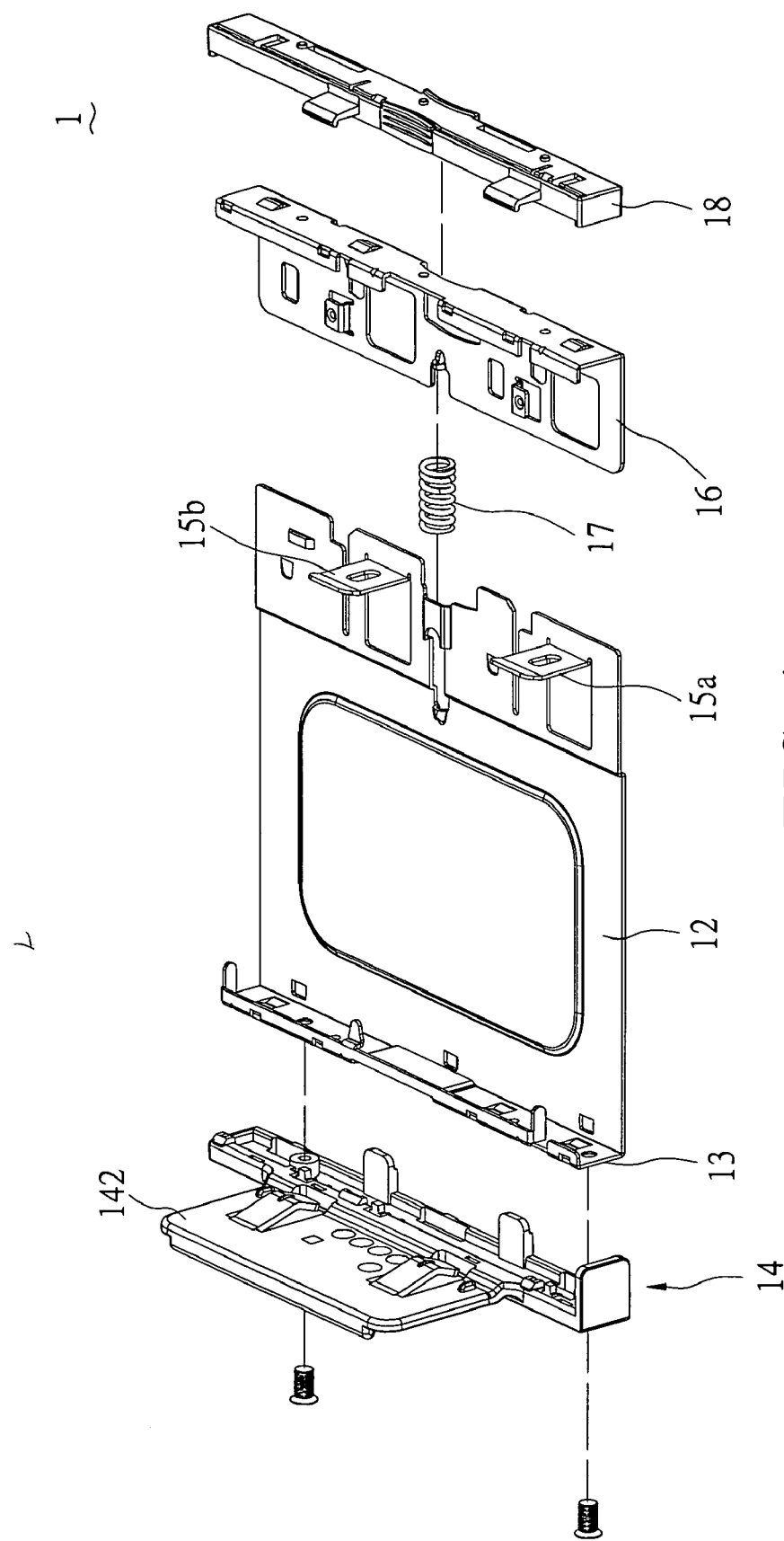
FIG. 4 is another exploded perspective view of a modular frame according to the present invention.
Figure 5:
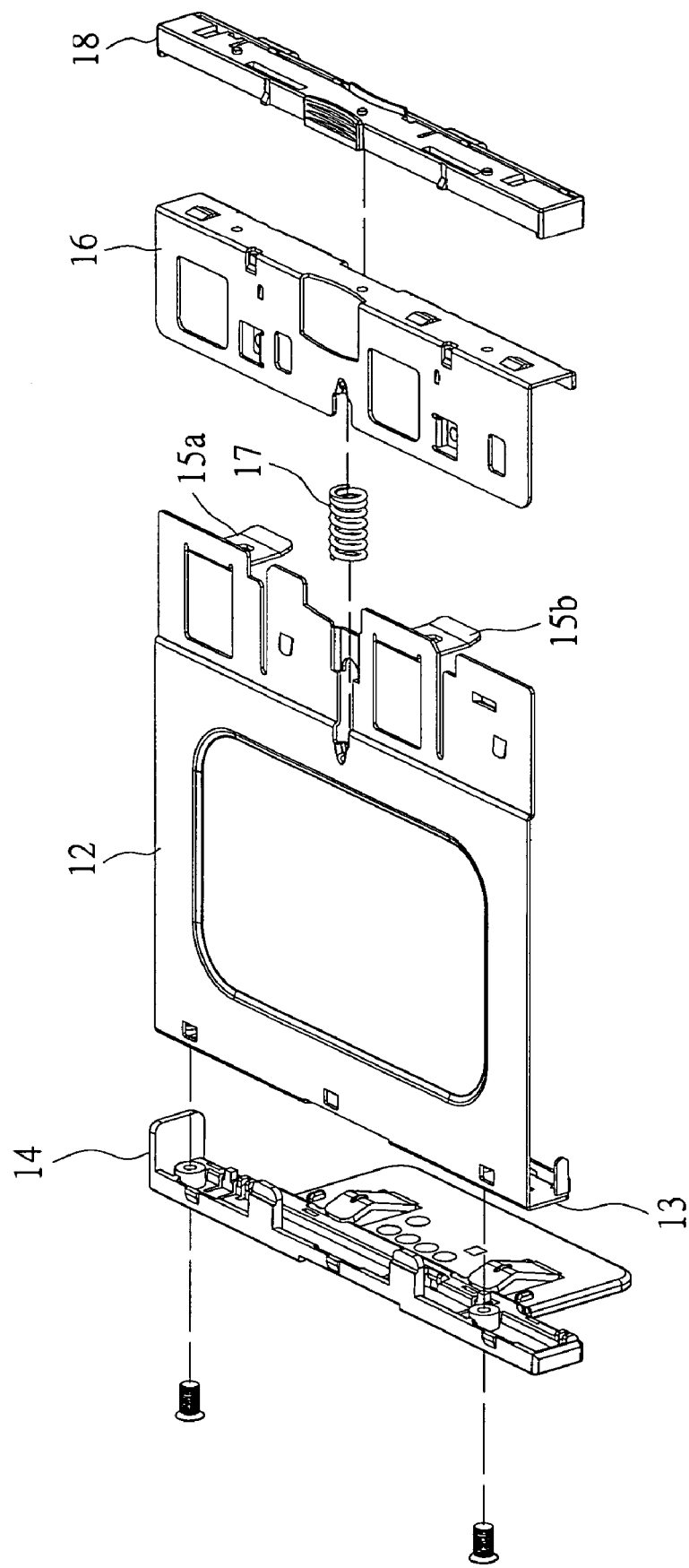
FIG. 5 is an exploded perspective view of a modular frame according to the present invention.

Reference is made to FIGS. 3 to 5, which are exploded views of a modular frame of the present invention in different views. The modular frame 1 comprises a base 12, a locking piece 16 and an elastic element 17 located between the base 12 and the locking piece 16. The locking piece 16 can be pull outwardly and elastically from the base 12, and the hard disk 3 can therefore be clipped between the base 12 the locking piece 16.

In detail, the base 12 is located on the bottom board 22 of the receiving housing 2 after assembly, which comprises a retaining sidewall 13 protruded from one side thereof. The locking piece 16 comprises a bottom wall 161, and a lateral wall 162 extending upwardly from one side of the bottom wall 161. The retaining sidewall 13 of the base 12 is opposite to the lateral wall 162 of the locking piece 16. The retaining sidewall 13 and the lateral wall 162 of the locking piece 16 have a plurality of locking pins 132 and 164, respectively. The locking pins 132 and 164 are inserted into the fixing holes 32 of the hard disk 3. The bottom wall 161 of the locking piece 16 is slidably mounted beneath the base 12. The lateral wall 162 is located on the side board 24 of the receiving housing 1.

The base 12 of the modular frame 1 is located between the locating tabs 221, 225 of the bottom board 22 after assembly. The locking piece 16 of the modular frame 1 is located between the locating tabs 242, 244, 246 of the side board 24. In this embodiment, the retaining sidewall 13 of the modular frame 1 has a plurality of orienting protrusions 131, 133, 135 protruding outwardly from it. The clipping plate 26 has a protrusive plate 261 and a positioning slot 263. The protrusive plate 261 is located between the orienting protrusions 131 and 133. The orienting protrusions 135 are adjacent to the locating tab 225.

In this embodiment, the modular frame 1 has an assembling component 14 that is made from plastic. The assembling components 14 are fixed on the retaining sidewall 13 of the base 12. In this embodiment, the assembling components 14 are assembled to an inner side of the retaining sidewall 13 via screws (not labeled). The assembling components 14 have a gripping part 142 protruding therefrom, which is suitable for gripping the modular frame 1 and the hard disk 3. The gripping part 142 forms at least one interference part 144 at an out side thereof. The clipping plate 26 forms a clipping hole 260 corresponding to the interference part 144, so that the gripping part 142 can be interfered with and fixed to the clipping plate 26. In this embodiment, the clipping hole 260 is formed on a protrusive platform (not labeled) that reduces the amount force of the interference part 144 when it scrapes against the clipping plate 26.

In this embodiment, to make locating the hard disk 3 easy, the base 12 further comprises a pair of restrictive sidewalls 15a and 15b, which are opposite the retaining sidewall 13. A distance between the restrictive sidewalls 15a, 15b and the retaining sidewall 13 is equal to a width of the hard disk 3. Moreover, the retaining sidewall 13 of the base 12 forms a top edge 134, and a lateral locking pin 136, so that it makes locating the modular frame 1 in the receiving housing 2 easier. One end of the assembling component 14 has a holding sidewall 141 protruding from it for stopping a side of the hard disk 3.

In this embodiment, the base 12 of the modular frame 1 forms a receiving slot 121 for receiving and fixing the elastic element 17, and a hooking portion 125 adjacent to the receiving slot 121 for connecting to one end of the elastic element 17. The bottom wall 161 of the locking piece 16 has a hooking portion 165 connecting to an other end of the elastic element 17. Therefore, the elastic element 17 is substantially hidden in the bottom of the modular frame 1.

In this embodiment, to move the locking piece 16 more smoothly, the bottom wall 161 of the locking piece 16 forms a pair of restrictive openings 166 corresponding to the restrictive sidewalls 15a, 15b. The restrictive sidewalls 15a, 15b are disposed in the restrictive opening 166.

In addition, the base 12 of the modular frame 1 forms a pair of guiding slots 123 with an open end. The bottom wall 161 of the locking piece 16 protrudes upwardly with a pair of L-shaped sliding tabs 163a. The pair of sliding tabs 163a are slidably disposed in the pair of guiding slots 123. The locking piece 16 further comprises a pair of guiding protrusions 163b corresponding to the pair of sliding tabs 163a and are disposed in the pair of guiding slots 123.

In this embodiment, to assist in locating the locking piece 16, the base 12 of the modular frame 1 has a pair of protrusions 127. The bottom wall 161 of the locking piece 16 has a pair of limit openings 167 and receives the pair of protrusions 127 correspondingly. A distance of the pair of protrusions 127 that are slid into the pair of limit openings 167 is equal to a length of the locking pins 164 of the locking piece 16 at least. The pair of protrusions 127 limits a moving distance of the locking piece 16, and the hard disk 3 is locked in the modular frame 1 after the locking pins 164 of the locking piece 16 have been moved.

The locking piece 16 is made of a metal piece via a sheet metal process. In this embodiment, so that the user can grip the locking piece 16 more safely, the modular frame 1 has a holding component 18 fixed to the lateral wall 162 of the locking piece 16. The holding component 18 is preferably made of plastic and respectively forms a skidproof part 182 at a top and a bottom surface thereof. In this embodiment, the holding component 18 is assembled to an inner side of the locking piece 16, so that it prevents collisions. In addition, the top edge of the holding component 18 has a pair of sheltering plates 184 corresponding to the pair of restrictive sidewalls 15a, 15b of the base 12.

Figure 6:
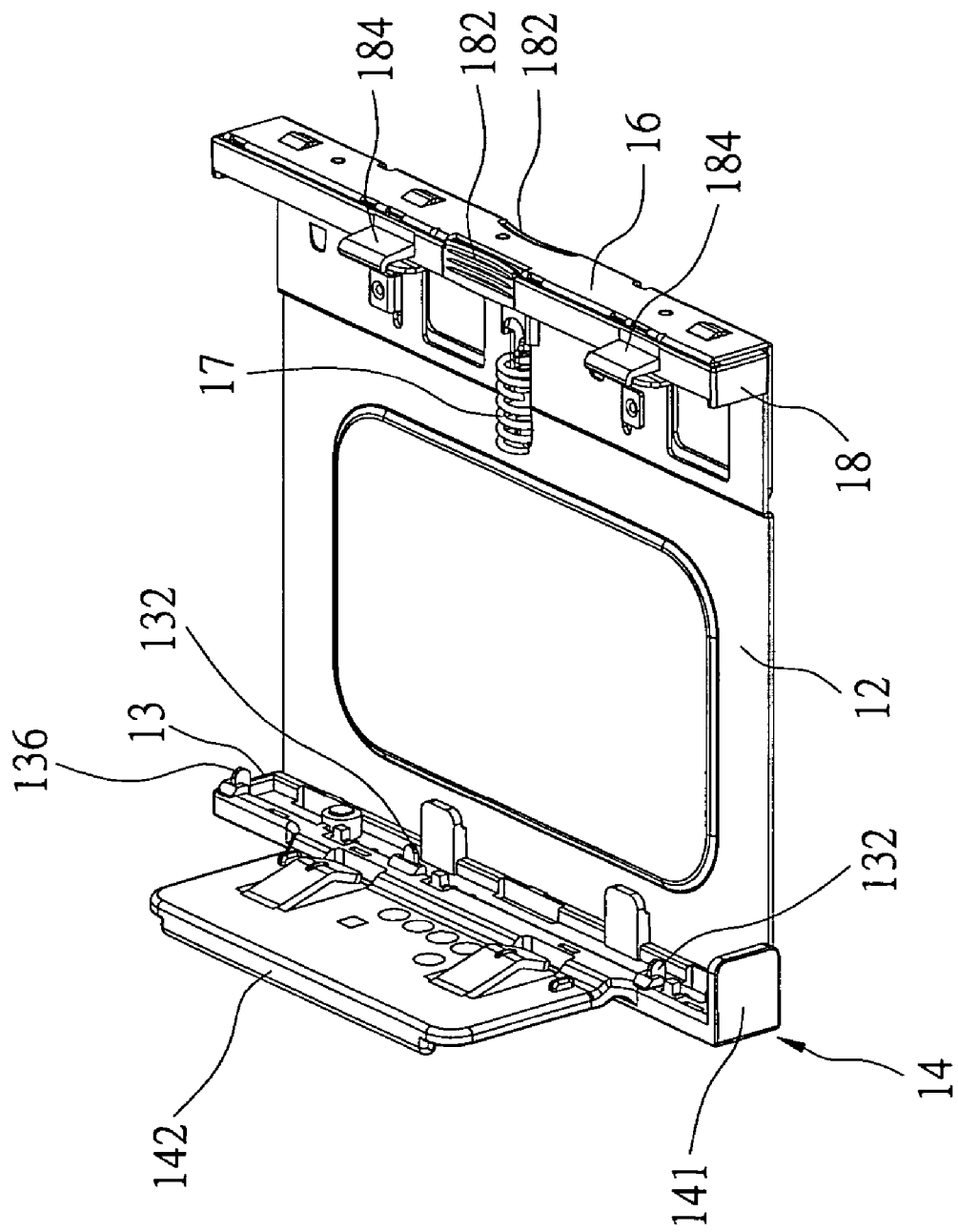
FIG. 6 is an assembled perspective view of a modular frame according to the present invention.

Reference is made to FIG. 6, which is an assembled perspective view of a modular frame of the present invention. When assembling the hard disk 3, firstly, one side of the hard disk 3 is slanted (as shown in FIG. 1) toward the retaining sidewall 13 of the base 12 and disposed into the modular frame 1. The gripping part 142 of the assembling components 14 can be held. Then, the skidproof part 182 of the holding component 18 is held, and the locking piece 16 is moved outward. To assemble the hard disk 3 into the modular frame 1, the locking piece 16 can flip back and clip to one side of the hard disk 3 because of the elastic force of the elastic element 17. Thereby, a locking action is finished.

After that, one side of the locking piece 16 of the modular frame 1 slants toward the side board 24 of the receiving housing 2 and is disposed for being located (as shown FIG. 2). The next step involves disposing the assembling components 14 downwardly into the bottom board 22 of the receiving housing 2, and making the assembling components 14 clip onto the clipping plate 26.

Figure 7:
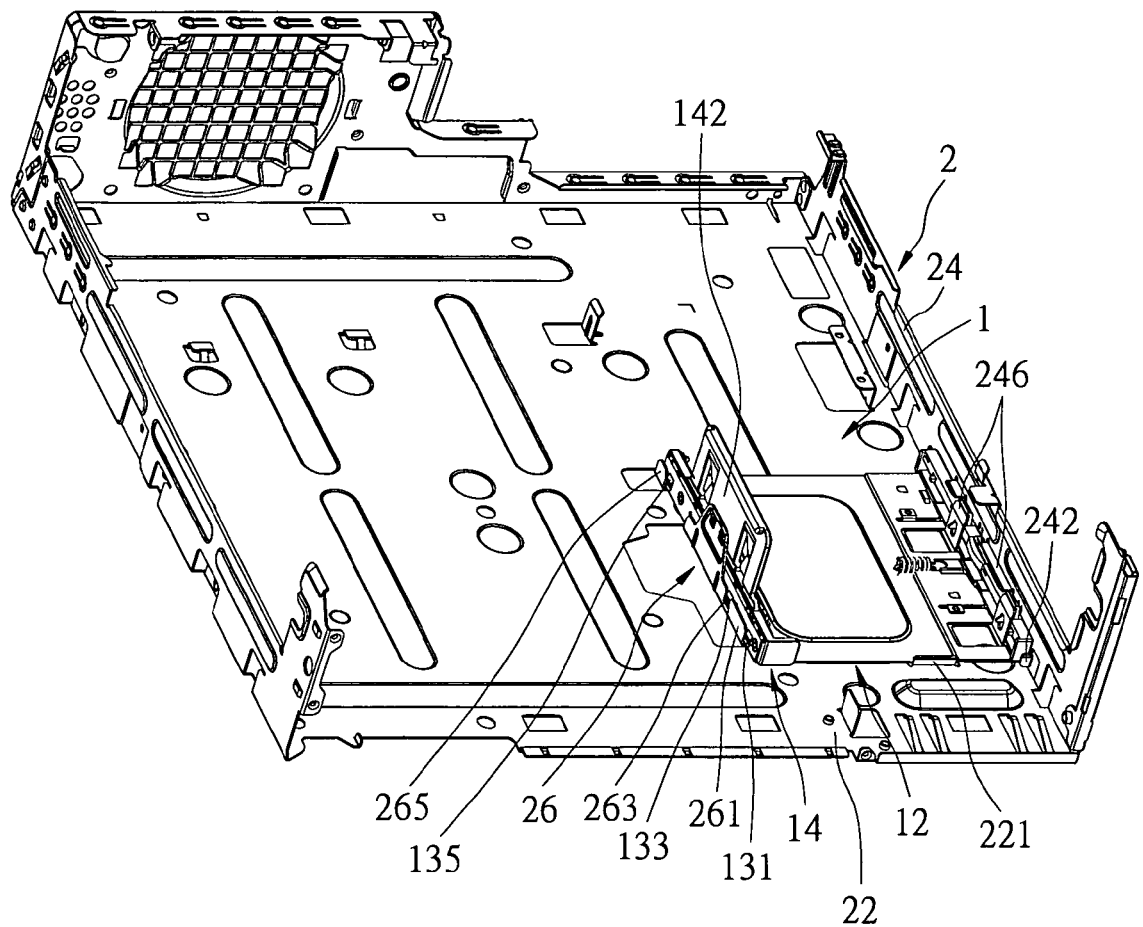
FIG. 7 is an assembled perspective view of a retaining modular mechanism for a hard disk according to the present invention.

Reference is made to FIG. 7, which is an assembled perspective view of a retaining modular mechanism for a hard disk according to the present invention. When unlocking, the present invention utilizes one side of the modular frame 1 as an axis to abut against one side of the receiving housing 2. Only the gripping part 142 of the assembling components 14 needs to be raised, and the modular frame and the hard disk can be withdrawn from the receiving housing 2. Moreover, the modular frame 1 has a modular design and can be considered as a single piece for processing beforehand or applied to other housing types.

The present invention applies the elasticity of a spring (elastic element) to combine the base 12 and the locking piece 16, so that only a pulling action is needed to lift up the holding component 18 and complete the locking/unlocking process for the hard disk. Compared with the fixing action of the prior art using four screws, the present invention saves a great deal of time.

The retaining modular mechanism for a hard disk of the present invention does not need screws. This enhances the safety of the process and protects the motherboard from the danger of a short resulting from a screw having fallen on the motherboard and not being removed before the computer is turned on.

It also deserves to be mentioned that the gripping part 142 of the assembling components 14 has a height that can be pressed by other components (such as a power case) after the host has been assembled, so that the components are very stable and cannot escape.

In conclusion, the present invention enables the user to fix or dismantle a hard disk more conveniently, (the user will also be able to be apply other components to the computer. The quick dismantling design is more convenient and succinct, and doesn't require other tools.

The description above only illustrates specific embodiments and examples of the invention. The invention should therefore cover various modifications and variations made to the herein-described structure and operations of the invention, provided they fall within the scope of the invention as defined in the following appended claims.

What is claimed is:

1. A retaining modular mechanism for a storage device, for fixing the storage device, said storage device having a plurality of fixing holes on two sides thereof, comprising:
    a receiving housing, having a bottom board and a side board bent from a side of said bottom board; and
    a modular frame, having:
        a base located on said bottom board,
        a locking piece, and
        an elastic element having one end connected to said base and having another end connected to said locking piece, said elastic element exerting a pulling force to urge said base and said locking piece in a direction toward each other,
        said locking piece having a bottom wall slidably mounted on said base, and a lateral wall extending upwardly from a side of said bottom wall and located on said side board of said receiving housing, said base having a retaining sidewall opposite to said lateral wall of said locking piece, a plurality of locking pins being respectively formed on said retaining sidewall of said base and said lateral wall of said locking piece, said locking pins being insertable and retained in said fixing holes of said storage device by the urging of said elastic element, said locking pins being removable from the fixing holes by sliding said locking piece away from said base and against the urging of said elastic element.

2. The retaining modular mechanism for a storage device as in claim 1, wherein said bottom board of said receiving housing has a plurality of locating tabs protruding therefrom, said side board of said receiving housing has a plurality of locating tabs protruding therefrom wherein said base of said modular frame is located among said locating tabs of said bottom board, said locking piece of said modular frame is located among said locating tabs of said side board.

3. The retaining modular mechanism for a storage device as in claim 1, wherein said bottom board of said receiving housing has a plate clipping protruding upwardly therefrom and clipping with a side of said modular frame.

4. The retaining modular mechanism for a storage device as in claim 3, wherein the modular frame comprises assembling components fixable on said retaining sidewall of said base, said assembling components comprises a protrusive gripping part, said gripping part being formed with at least one interference part interfering with and fixed on said clipping plate.

5. The retaining modular mechanism for a storage device as in claim 1, wherein said base of said modular frame comprises at least one restrictive sidewall opposite to said retaining sidewall, a distance between said restrictive sidewall and said retaining sidewall being equal to a width of said storage device.

6. The retaining modular mechanism for a storage device as in claim 5, wherein said bottom wall of said locking piece comprises at least one restrictive opening corresponding to said restrictive sidewall, said restrictive sidewall being located in said restrictive opening.

7. The retaining modular mechanism for a storage device as in claim 1, wherein said base of said modular frame has a receiving slot formed thereon for receiving said elastic element and a hooking portion adjacent to said receiving slot and connected with one end of said elastic element, wherein said bottom wall of said locking piece is formed with a hooking portion connected with another end of said elastic element.

8. The retaining modular mechanism for a storage device as in claim 1, wherein said base of said modular frame is formed with a pair of guiding slots in an open-ended way, said bottom wall of said locking piece has a pair of L-shaped sliding tabs protruding upwardly, said pair of sliding tabs being respectively slidably mounted in said pair of guiding slots.

9. The retaining modular mechanism for a storage device as in claim 8, wherein said locking piece further comprises a pair of guiding protrusions corresponding to said pair of sliding tabs and being assembled in said pair of guiding slots.

10. The retaining modular mechanism for a storage device as in claim 1, wherein said base of said modular frame comprises a pair of protrusions, said bottom wall of said locking piece has a pair of limit openings respectively receiving said pair of protrusions correspondingly, a distance of said pair of protrusions slid in said pair of limit openings being equal to at least a length of said locking pins of said locking piece.

11. The retaining modular mechanism for a storage device as in claim 1, wherein said modular frame comprises a holding component fixed on said lateral wall of said locking piece.

12. A modular frame, used in a retaining modular mechanism for a storage device, said modular frame comprising:
    a base, made of a metallic board, said base having a retaining sidewall formed with a plurality of locking pins;
    a locking piece, having a bottom wall slidably and parallelly mounted on said base, and a lateral wall protruding upwardly from a side of said bottom wall and opposite to said retaining sidewall of said base, said lateral wall being formed with a plurality of locking pins; and an elastic element, having one end connected to said base and having another end connected to said bottom wall of said locking piece, said elastic element exerting a pulling force to urge said base and said bottom wall of said locking niece toward each other.

13. The modular frame as in claim 12, wherein said base comprises a retaining sidewall opposite to said locking piece, said locking pins of said base being bent from said retaining sidewall.

14. The modular frame as in claim 12, further comprising an assembling component fixed on said retaining sidewall of said base, said assembling component having a protrusive gripping part.

15. The modular frame as in claim 12, wherein said base of said modular frame comprises at least one restrictive sidewall opposite to said retaining sidewall, a distance between said restrictive sidewall and said retaining sidewall being equal to a width of said storage device.

16. The modular frame as in claim 15, wherein said bottom wall of said locking piece forms at least one restrictive opening corresponding to said restrictive sidewall, said restrictive sidewall being located in said restrictive opening.

17. The modular frame as in claim 12, wherein said base of said modular frame includes a receiving slot for receiving said elastic element, and a hooking portion is adjacent to said receiving slot and connected with one end of said elastic element, wherein said bottom wall of said locking piece has a hooking portion connected to another end of said elastic element.

18. The modular frame as in claim 12, wherein said base of said modular frame is formed with a pair of guiding slots in an open-ended way, said bottom wall of said locking piece protrudes upwardly with a pair of L-shaped sliding tabs, said pair of sliding tabs being slidably mounted in said pair of guiding slots correspondingly.

19. The modular frame as in claim 18, wherein said locking piece further comprises a pair of guiding protrusions corresponding to said pair of sliding tabs and located in said pair of guiding slots.

20. The modular frame as in claim 12, wherein said base of said modular frame has a pair of protrusions, said bottom wall of said locking piece has a pair of limit openings for receiving said pair of protrusions correspondingly, a distance of said pair of protrusions slid in said pair of limit openings being equal to a length of said locking pins.

21. The modular frame as in claim 12, wherein said modular frame comprises a holding component fixed on said lateral wall of said locking piece.

22. The retaining modular mechanism for a storage device as in claim 1, wherein said storage device is a hard disk.

23. The modular frame as in claim 12, wherein said storage device is a hard disk.

* * * * *